United States Patent [19]
Bernard et al.

[11] Patent Number: 4,559,415
[45] Date of Patent: Dec. 17, 1985

[54] CHARGING PROCESS FOR SELLING INFORMATION BY TELEPHONE

[76] Inventors: Alain Bernard, 4 bis rue Alexandre Bontemps, 78000 Versailles; Didier Dupraz, 4 rue Denfert Rochereau, 92600 Asnières, both of France

[21] Appl. No.: 576,429

[22] Filed: Feb. 2, 1984

[30] Foreign Application Priority Data

Feb. 4, 1983 [FR] France .................................. 83 01775

[51] Int. Cl.⁴ ........................................... H04M 15/32
[52] U.S. Cl. .................................................. 179/2 DP
[58] Field of Search ........... 179/2 DP, 7.1 R, 7.1 TP, 179/2 CA, 2 A

[56] References Cited

U.S. PATENT DOCUMENTS

| | | | |
|---|---|---|---|
| 4,165,446 | 8/1979 | Flowers et al. | 179/2 DP |
| 4,340,783 | 7/1982 | Sugiyama et al. | 179/2 A |
| 4,387,271 | 6/1983 | Artom | 179/2 DP |
| 4,489,438 | 12/1984 | Hughes | 179/2 A X |

FOREIGN PATENT DOCUMENTS

| | | | |
|---|---|---|---|
| 1162336 | 2/1984 | Canada | 179/2 DP |
| 32410 | 7/1981 | European Pat. Off. | 179/2 DP |
| 1195367 | 6/1965 | Fed. Rep. of Germany . | |
| 2942348 | 4/1981 | Fed. Rep. of Germany . | |
| 3229592 | 2/1984 | Fed. Rep. of Germany ... | 179/7.1 R |

Primary Examiner—Keith E. George
Attorney, Agent, or Firm—Oblon, Fisher, Spivak, McClelland & Maier

[57] ABSTRACT

A charging process for selling information via a telephone network. A data bank can be connected via said network with calling subscribers. This data bank has a telephone number and a device for supplying a spoken message. The data bank supplies its message to any calling subscriber as of the time at which a call from said subscriber is received, and the duration of the message supplied by the data bank is fixed. A number is allocated which, for the telephone network, is considered to correspond to a time-based charge based on a certain charge band, this number also implying a routing of the call via time-based charging means. The fixed duration of the message and the charge band are chosen in such a way that the total of the charge charged to the calling subscriber for receiving the complete message contains an extra charge of at least one unit compared with the charge which would have been made to him for a call of the same duration with a subscriber belonging to the same local distribution area as the data bank. The number of calls to which the data bank has replied are counted and the number of extra charges charged is deducted therefrom.

3 Claims, 3 Drawing Figures

CHARGING PROCESS FOR SELLING INFORMATION BY TELEPHONE

BACKGROUND OF THE INVENTION

1. Field of the Invention

The present invention relates to a charging process for selling information by telephone.

2. Discussion of the Background

Several different processes are used for selling information by telephone. According to a first process, a caller calls by means of his telephone line an information supply organization, with which he has a subscription. The call is received by the operator who firstly identifies the caller either by calling him back by telephone, or by making him give a confidential access code (pass word or number). This confidential code is given to the customer in exchange for the payment of his subscription or the opening of a debit account. Once the identity of the caller has been checked, the desired information is supplied by an Expert having access to manual or computerized information. The message transmitted to the caller has a random duration, which is naturally dependent on the nature of the information sought.

This process suffers from disadvantages in that the identification of callers, the keeping up to date of customers' accounts, the management of access codes and subscriptions, etc. are long, complicated and dull tasks.

Other information distribution processes are known, which use automatic means called data banks. In such systems, the caller is connected to a computer, which firstly starts off an identificatiion operation and only then is the caller allowed to interrogate the data bank.

These two special operations, namely identification and interrogation, call for a specific data communications terminal able to transmit on a telephone line special codes which can be recognized by the computer and without interrupting the call. Thus, access to the information is only available to users having such a terminal.

Thus, this type of service only affects a small proportion of telephone subscribers, which is not very satisfactory.

If it is wished to extend across to a data bank to all telephone subscribers, in view of the present structure of the most widely used telephone terminals, it is necessary that this information is supplied in spoken form, that it is free, i.e. the data bank does not seek payment from the caller or, if it is not free, the caller can identify himself in a simple manner.

These charging difficulties during the sale of information partly explain why certain organizations prefer to give information free, e.g. information concerning the state of the roads, weather forecasts, etc. However, there are other services where invoicing takes place in a simple, lump sum manner. For example, in France, this is the case with the telephoned information service accessibly by dialling 12 (or 12.12).

The diagram of FIG. 1 defines the structure of systems of this type. As shown (in simplified manner so as to only show the organs involved more or less directly in the charging operation), the system comprises subscriber's telephone sets 10, an exchange 20 having subscriber's equipment 22, counters 24 associated with said equipment, a switching network 26, a control unit 28, a dial pulse receiver 30 and junctors. There are three junctor types, namely a local junctor 32 used for local calls, an information junctor 34 connected to an operator line 35 and a circuit junctor 38 connected to external lines 39, the latter being connected to a timing mechanism 40. These junctors are connected to each subscriber's counter 24 by a charging wire 42.

This system functions in the following way. When a subscriber removes the receiver, his equipment 22 identifies him and the information is transmitted to the control unit 28 which puts the dial pulse receiver 30 into operation via switching system 26. The receiver receives the number transmitted by the caller, transmits it to the control unit 28 which, recognizing the information number (12 or 12.12) orders the switching network 26 to connect the subscriber's equipment 22 to the information junctor 34 and not to the local junctor 32 or circuit junctor 38. Thus, it is the information junctor 34 which transmits the adequate charging instruction to the subscriber's equipment counter 24. This is a so-called quantum charge, which corresponds to two charge units charged as from the start of the call.

It should be noted that, when called, the local junctor 32 only initiates a single charge unit, no matter what the duration of the call. However, the circuit junctor 38 initiates a charge, which is a function of the distance between subscribers and the duration of the call by means of the timing mechanism 40, which defines the charge bands to be used and which counts the number of such bands.

Thus, the function of this system is to advance by two units the counter of the calling subscriber's counter, when the latter is connected to an information operator, whereas in the case of a local call, said counter only advances by a single unit. Thus, there is an extra charge of one unit.

Such a service does not suffer from the disadvantages referred to hereinbefore, because the service offered by the information centre is charged as a function of the consumption of each subscriber without it being necessary for him to have a special terminal, identification taking place automatically by means of the subscriber's telephone number. Moreover, the invoicing of the service is easy and leads to no specific charge for the network administration services.

However, such a system still suffers from the disadvantages of requiring the provision in each telephone exchange of special junctors (like junctors 34) able to control the subscriber's counters in an appropriate manner, such junctors being costly, and the data bank receive no renumeration, because the charges corresponding to the service are included in the general invoice sent to the subscriber, where no distinction is made as compared with ordinary call charges.

SUMMARY OF THE INVENTION

The object of the present invention is to provide a charging process obviating these disadvantages. According to the invention this object is achieved essentially by giving the information messages a fixed duration, which is determined as a function of the charging periods of subscribers having access to the information service, the duration of the messages lasting longer than one charge band unit, the number of calls to the data bank is counted and a time-based charge is made using the means conventionally provided for this purpose.

Thus, with such a process, on the one hand the time-based charging of a message lasting longer than a charging period makes it possible to produce an extra charge, and on the other hand the counting of the number of calls makes it possible to calculate the number of extra charges made and consequently the part of the invoice which can be attributed to the data bank.

According to the invention these advantages are obtained without modifying existing equipment, all of which have time-based charging means. It is therefore merely necessary to provide a special routing for calls between calling subscribers and the data bank across such time-based charging means and to provide a call counter in the data bank.

It should be noted that information data banks already exist, which supply messages of a predetermined duration. However, these data banks supply their messages in an uninterrupted cyclic manner. In this type of system, when the caller comes into contact with the data bank, he receives a message which is already being transmitted. He must therefore wait for the next transmission to complete the message by its start. There is consequently an uncertainty regarding the duration during which the caller remains connected to the data bank and this can amount to almost twice the duration of the message. Thus, in order to realize the invention, it is necessary to use a special data bank which supplies its message when a call is made and not in a permanent manner. Thus, the caller receives the information in a normal chronological order. Data banks already exist, which are able to supply several telephone lines in parallel. Generally these are constituted by devices incorporating a word memory constituted by a group of shift registers looped on to themselves, each register being able to supply a word at time intervals equal to or exceeding the time necessary for its emptying and reloading.

BRIEF DESCRIPTION OF THE DRAWINGS

The invention is described in greater detail hereinafter relative to non-limitative embodiments and with reference to the attached drawings, following the already described FIG. 1, and wherein show.

DESCRIPTION OF THE PREFERRED EMBODIMENTS

Figure 1:
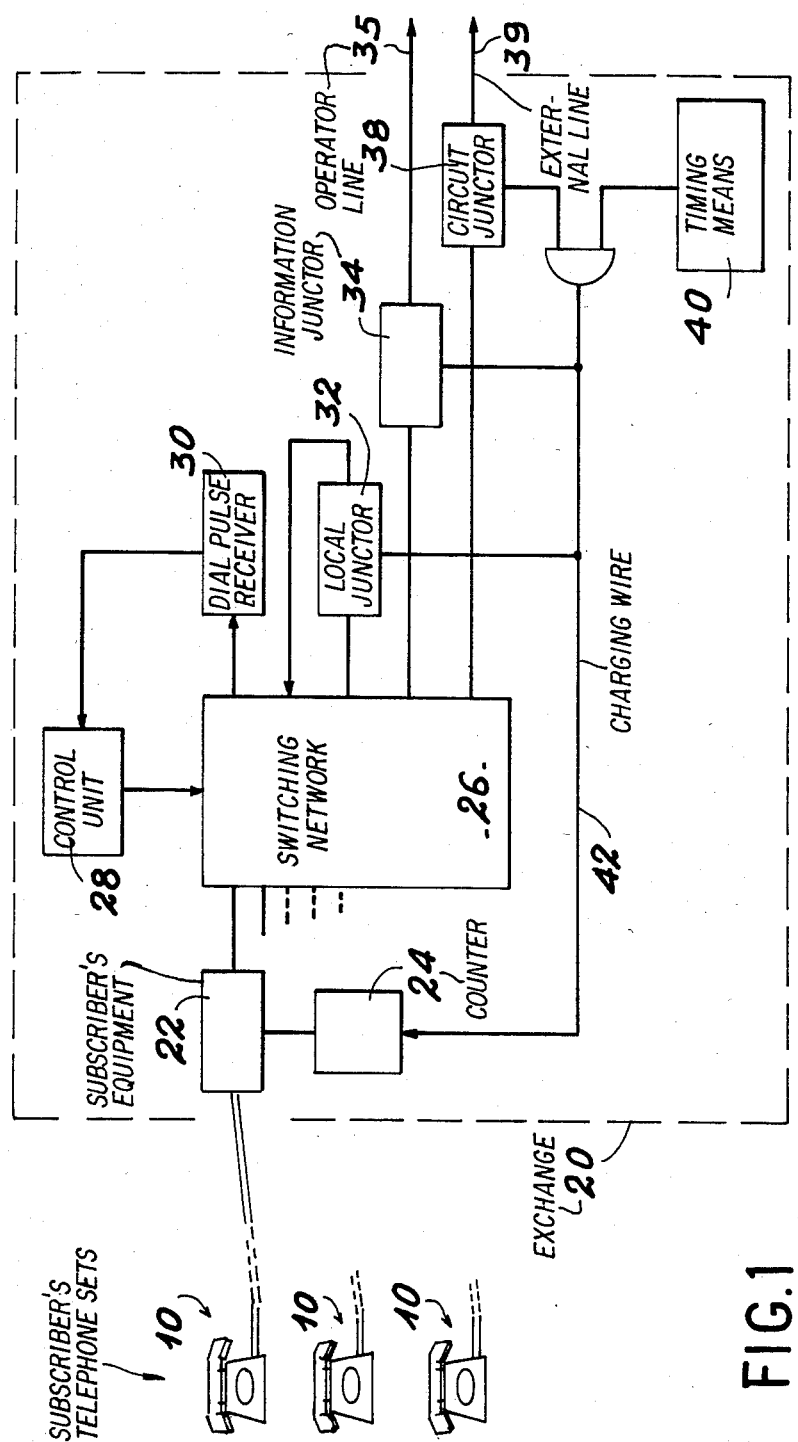
Figure 2:
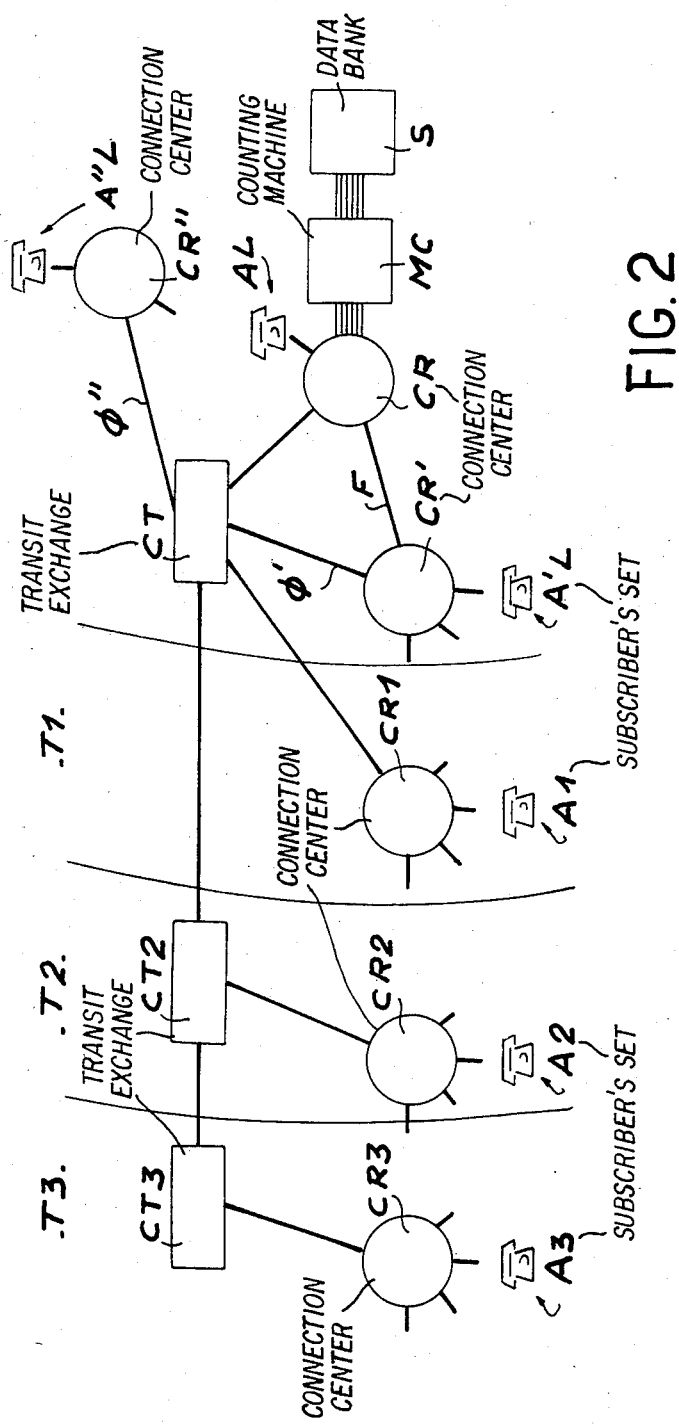
FIG. 2 an example of a telephone system permitting the realization of the process according to the invention.

The principle of the invention can be described in greater detail by firstly considering the simple case where the calling subscriber and data bank are located in the same local area, i.e. in an area where calls between subscribers are based on the number of calls and not on their duration. In the manner illustrated in the right-hand part of FIG. 2, such a local area comprises connection centres (e.g. of the routing autonomy switch type) CR, CR', CR", a data bank S, a counting machine MC and a transit exchange CT permitting routing to other areas located in the left-hand part of the drawing and which will be subsequently considered.

Certain connection centres are interconnected by direct line groups, e.g. CR and CR' connected by group F. The subscribers connected to centres CF' and CR" are respectively designated by $A'_L$ and $A''_L$ (L indicating the local nature of the subscriber). The data bank is connected to centre CR, which also has its own subscribers $A_L$. The connection centres do not have junctors able to put into effect a time-based charging, because there is no passage beyond the local zone between the individual switches.

Certain switches (CR', CR") are connected to the transit exchange CT by line groups $\phi'$, $\phi''$, such an exchange being provided with mixed counting means (per call and time-based). The calls between information requesting subscribers and the data bank pass through it, even if there is a direct line group between the switch to which is connected the subscriber and the switch connecting to the data bank (which is the case e.g. for subscribers $A'_L$).

This special routing is obtained by allocating a special telephone number to the data bank. In the conventional French numbering system, a number contains a prefix BPQ which defines the routing and the charge. This prefix is followed by the four letters MCDU, which are the letters for thousands, hundreds, tens and units. Group BPQ permits the correct routing across the transit exchange CT, i.e. across means permitting a time-based charging. For this purpose the data bank BPQ is considered, by the different switching means of the telephone network used, to require a routing by the means in question.

It is known that in time-based charging, a charge or base unit is charged to the caller at the start of the call and in fact as soon as the called person has removed the receiver. Another unit is then charged every T seconds, T designating a charge period determined as a function of the distance and hereinafter called the charge band. All the exchanges are informed of the fact that the group BPQ allocated to the data bank must be looked upon as a time-based charge (although, as stated, the calling subscriber is located in the same local area as the data bank).

According to the invention, the message supplied by the data bank has a constant duration, which exceeds this charge band, so that the total charge charged to the caller for the reception of the complete message is at least two units. Thus, this amount includes an extra charge of at least one unit compared with the charge which would have been charged to the calling subscriber for a call to another subscriber in said local area, e.g. with subscriber $A_L$. By counting (in a defined period which can be one, two, three months, etc) the number of calls to which the data bank has replied, it is possible to define the number of extra charges corresponding to the supply of information, i.e. that part to be allocated to the data bank.

The charge bands can have several values according to the period of use, i.e. in France depending on whether the call is made by day or by night. The daytime period is equal to half the nighttime period. Thus, the largest of the two values is considered when fixing the minimum duration of the message. For example, for a daytime rate of 120 s and a nighttime rate of 240 s, the message will be given a duration exceeding 240 s and e.g. a duration between 240 and 360 s. Thus, the subscriber who has received the message will be charged with two units at night and three units by day.

The count made at the data bank must naturally be able to distinguish the daytime call from the nighttime calls, so that in the total statement of charges due from subscribers, that part of the extra charge due to the data bank will be correctly defined.

As the accuracy of the timing mechanisms used for calculating charges is not inifinite and an error e on the measurement of the durations is always possible, the duration between 240+e and 360−e will be given to the message.

In the aforementioned example, the data bank and calling subscriber are in the same local area. However, the invention naturally also applies to the case when the calling subscriber is in an area other than that in which the data bank is located. This will now be considered in connection with the left-hand part of the diagram of FIG. 2.

It is possible to see three areas, the first having a connection centre $CR_1$, whose subscribers are designated $A_1$, the second having a connection centre $CR_2$, whose subscribers are designated $A_2$ and also a transit exchange $CT_2$, and a third having a connection centre $CR_3$, subscribers $A_3$ and a transit exchange $CT_3$. These calls to the local area are subject to a time-based charging, whose normal bands are respectively $T_1$, $T_2$, $T_3$. A precaution must be taken in the case where certain of these bands are less than the period used as a basis for determining the duration of the message.

In general terms, by designating by n the number of charge units normally charged for a call of duration t, with a charge band T, we obtain:

$$n = 1 + \text{integral part of } (t/T).$$

On designating in the same way by m the number of charge units charged to the subscriber who has received the message, with a charge band T', we obtain:

$$m = 1 + \text{integral part of } (t/T').$$

In the second case and in accordance with the invention, we obtain an extra charge of at least one unit compared with the first, i.e.

$$m \geq n + 1$$

This relation makes it possible to define the band T' to be taken into account, as well as the appropriate duration t of the message. It is therefore necessary to have:

$$\text{integral part } (t/T') \geq 1 + \text{integral part of } (t/T).$$

As several areas of different bands $T_i$ have access to the data bank, there is consequently a system of such inequation making it possible to define the bands $T'_i$ (differing from $T_i$) for the different areas, as well as the duration t of the message.

Thus, for very short times $T_i$, the number of ordinary charge units will be looked upon as prohibitive by subscribers, who will then forego this service. For example, for a band of 12 s and a message duration of 240 s, it would be 20 charge units. Thus, in practice, it is only necessary to take account of the bands of areas close to that of the data bank.

Figure 3:
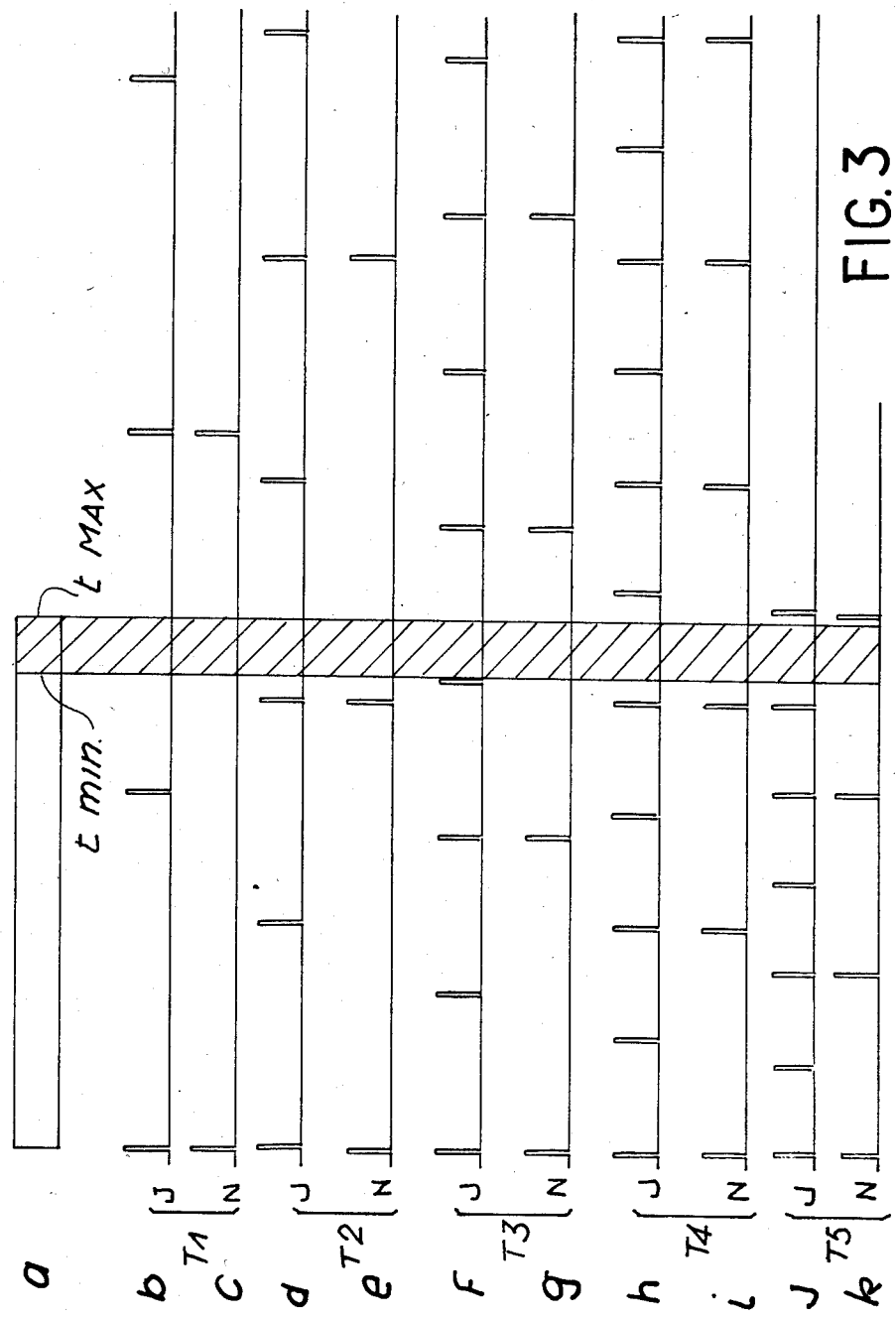
FIG. 3 a chart illustrating the charging principle used in the invention.

It should be noted that a distinction must be made between daytime and nighttime calls. If the nighttime rate band is double the day-time band, bands $T'_i$ must be the longest band, i.e. the night bands. The duration of the message will be regulated in such a way that the extra charge is at least one unit at night and will then be two units by day:

$$m_{night} = n_{night} + 1$$

then $m_{day} = n_{day} + 2$ with $n_{night} = 1 + \text{integral part of } (t/T)$ $n_{day} = 1 + \text{integral part of } (2t/T)$ These questions can be defined on examples with the aid of FIG. 3, which shows a time chart in which:
line a represents a fixed duration message between a minimum and a maximum,
lines b and c show the charge pulses for a band of duration $T_1$, respectively for day (J) and for night (N),
lines d to k show the same pulses for different duration bands, namely:
lines d and e for a band $T_2$,
lines f and g for a band $T_3$,
lines h and i for a band $T_4$,
lines j and k for a band $T_5$.

The following table gives a better understanding of the different cases illustrated in FIG. 3. The first column gives the type of calling subscriber: $A'_L$ and $A''_L$ are the subscribers of the local area in which the data bank is located, whilst subscribers $A_1$, $A_2$, $A_3$ are outside said local area. The second column gives the charge band when subscriber $A_L$ is called, $A_L$ being connected to the same centre CR as the data bank. If $A'_L$ or $A''_L$ calls $A_L$, charging is based on the number of calls and not on the duration. The third column gives the charge band in the case when the data bank is called. For subscribers $A'_L$ and $A''_L$, said band is $T_2$, which, at night, (see line (e) in FIG. 3) makes it possible to have the desired extra charge of one unit. Band $T_1$ would not be suitable because, at night, there would be no extra charge. The four last columns indicate in each case the number of charge units TB, which are due when the called person is either a daytime subscriber $A_L$, or the daytime data bank, or a nighttime subscriber $A_L$, or the nighttime data bank. Thus, if it is wished to always obtain an extra charge of at least one unit between the number of charges corresponding to the nighttime data bank (final column) and the number of charges corresponding to the nighttime subscriber $A_L$ (penultimate column), it is necessary to charge the charge bands for the service, which are not necessarily the charge bands for calls from subscribers $A_L$. Thus, in the case of subscribers $A_3$, subject to a band $T_3$, when they call a $A_L$, it is necessary to use a band $T_4$ (or $T_5$) when they call the data bank (penultimate and second from last lines in the table). If the duration chosen is too short, or if it is a constraint which excessively limits the duration of the message, it is possible to exclude subscribers $A_3$ from the service by not giving the BPQ of the data bank to the exchange serving this area (final line in the table).

Naturally, hereinbefore, the fact that the extra charge due to the information service is equal to one charge unit at night and two charge units by day has only been given as an example and it is possible to choose a larger extra charge without passing beyond the scope of the invention. The invention naturally also applies to any switched telephone network, no matter what its nature, architecture or organization.

TABLE

| Calling subscriber | Called $A_L$ | Data bank | $A_L$ day | Data bank day | $A_L$ night | Data bank night |
|---|---|---|---|---|---|---|
| $A'_L$ | (local) | $T_2$ | 1TB | 3TB | 1TB | 2TB |
| $A''_L$ | (local) | $T_2$ | 1TB | 3TB | 1TB | 2TB |
| $A_1$ | $T_1$ | $T_3$ | 2TB | 4TB | 1TB | 2TB |
| $A_2$ | $T_2$ | $T_4$ | 3TB | 5TB | 2TB | 3TB |
| $A_3$ | $T_3$ | $T_4$ | 4TB | 5TB | 2TB | 3TB |

TABLE-continued

| Calling sub-scriber | Called $A_L$ | Data bank | $A_L$ day | Data bank day | $A_L$ night | Data bank night |
|---|---|---|---|---|---|---|
| $A_3$ | $T_3$ | $T_5$ | 4TB | 6TB | 2TB | 3TB |
| $A_3$ | $T_3$ | BPQ not given | 4TB | service unavailable | 2TB | service unavailable |

We claim:

1. A charging process for selling information via a telephone network in which a data bank is connected via said network with calling subscribers, said data bank having a telephone number and means for supplying a spoken message, wherein said process comprises the steps of:

supplying from said data bank a message to any calling subscriber as of the time at which a call from said subscriber is received;

giving to the message supplied by said data bank a fixed duration;

allocating to said data bank a number which, for the telephone network, is considered to correspond to a time-based charge based on a certain charge band, said number also implying a routing of the call via time-based charging means;

choosing said fixed duration of the message and the charge band in such a way that the total of the charge charged to the calling subscriber for receiving the complete message contains an extra charge of at least one unit compared with the charge which would have been made to him for a call of the same duration with a subscriber belonging to the same local distribution area as the data bank;

counting the number of calls to which the data bank has replied and deducting the number of extra charges charged therefrom, and calculating the proportion of the charges attributable to the data bank.

2. A process according to claim 1, further comprising the steps of permitting access to the data bank not only to subscribers belonging to the same local area as the data bank, but also to subscribers belonging to other areas for which the normal time-based charge band is less than that corresponding to the area of the data bank, and chosing the duration of the message and the real charge band relative to the data bank so that the charge due to the transmission of the message contains an extra charge of at least one unit.

3. A process according to claims 1 or 2, further comprising the step of basing the time-based charge on a daytime band and a nighttime band, the latter being longer than the former, the duration of the message being at least equal to the night-time band.

* * * * *